United States Patent
Lai et al.

(10) Patent No.: US 11,070,825 B2
(45) Date of Patent: Jul. 20, 2021

(54) METHOD AND APPARATUS OF ENCODING OR DECODING VIDEO DATA WITH ADAPTIVE COLOUR TRANSFORM

(71) Applicant: MEDIATEK INC., Hsinchu (TW)

(72) Inventors: Chen-Yen Lai, Hsinchu (TW);
Tzu-Der Chuang, Hsinchu (TW);
Ching-Yeh Chen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/897,444

(22) Filed: Jun. 10, 2020

(65) Prior Publication Data

US 2020/0396467 A1 Dec. 17, 2020

Related U.S. Application Data

(60) Provisional application No. 62/860,861, filed on Jun. 13, 2019.

(51) Int. Cl.
*H04N 19/186* (2014.01)
*H04N 19/96* (2014.01)
*H04N 19/593* (2014.01)

(52) U.S. Cl.
CPC ......... *H04N 19/186* (2014.11); *H04N 19/593* (2014.11); *H04N 19/96* (2014.11)

(58) Field of Classification Search
None
See application file for complete search history.

(56) References Cited

U.S. PATENT DOCUMENTS

| | | | |
|---|---|---|---|
| 2014/0376608 A1* | 12/2014 | Tourapis | H04N 19/82 375/240.02 |
| 2014/0376619 A1* | 12/2014 | Tourapis | H04N 19/117 375/240.03 |
| 2016/0100168 A1* | 4/2016 | Rapaka | H04N 19/12 375/240.03 |
| 2017/0359595 A1* | 12/2017 | Zhang | H04N 19/593 |

\* cited by examiner

*Primary Examiner* — Talha M Nawaz
(74) *Attorney, Agent, or Firm* — McClure, Qualey & Rodack, LLP

(57) ABSTRACT

Video processing methods include receiving input data of a current block in a current picture, determining if a luma component and chroma components of the current block are coded using different splitting trees, disabling Adaptive Colour Transform (ACT) on the current block when the luma component and the chroma components of the current block are coded using different splitting trees, and encoding or decoding the current block. ACT is only allowed to be performed on blocks coded in single tree block partitioning to convert a RGB colour space into an YCoCg colour space. ACT is applied to residues according to some embodiments, or ACT is applied to input data and predictors according to some other embodiments.

20 Claims, 6 Drawing Sheets in SCC, namely intra palette coding (CPC).

a CU (coding unit) will

Fig. 1

METHOD AND APPARATUS OF ENCODING OR DECODING VIDEO DATA WITH ADAPTIVE COLOUR TRANSFORM

CROSS REFERENCE TO RELATED APPLICATIONS

The present invention claims priority to U.S. Provisional Patent Application, Ser. No. 62/860,861, filed on Jun. 13, 2019, entitled "Methods of Current Picture Referencing for Dual Tree Structure". The above U.S. Provisional Patent Application is hereby incorporated by reference in its entirety.

FIELD OF THE INVENTION

The present invention relates to video encoding and decoding colour video data. In particular, the present invention relates to implementing adaptive colour transform in video coding systems.

BACKGROUND AND RELATED ART

The High Efficiency Video Coding (HEVC) standard is the latest video coding standard developed by the Joint Collaborative Team on Video Coding (JCT-VC) group of video coding experts from ITU-T Study Group. The HEVC standard relies on a block-based coding structure which divides each slice into multiple Coding Tree Units (CTUs). A coded picture is represented by one or a collection of slices, each slice includes an integer number of CTUs. The individual CTUs in a slice are processed according to a raster scanning order. In the HEVC main profile, minimum and maximum sizes of a CTU are specified by syntax elements in the Sequence Parameter Set (SPS) among the sizes of 8×8, 16×16, 32×32, and 64×64. Sample values of each block in a Bi-predictive (B) slice are decoded using intra picture prediction or inter picture prediction using at most two motion vectors and reference indices. Sample values of each block in a Predictive (P) slice is decoded using intra picture prediction or inter picture prediction using only one motion vector and reference index. An Intra (I) slice is decoded using intra picture prediction only. Each CTU is further recursively divided into one or more Coding Units (CUs) according to a quadtree (QT) splitting process to adapt to various local motion and texture characteristics. A CTU size is M×M, where M is one of the values of 64, 32, and 16. Each CTU is either a single CU or recursively split into four smaller units of equal sizes of M/2×M/2, which are referred to as nodes of a coding tree. If a node is not further split, it is a leaf node of the coding tree, and each leaf node is a CU. The quadtree splitting process can be iterated until the size of a node reaches a minimum allowed CU size specified in the SPS.

The prediction decision is made at the CU level, where each CU is either coded by inter picture (temporal) prediction or intra picture (spatial) prediction. Since the minimum CU size can be 8×8, the minimum granularity for switching different basic prediction type is 8×8. Once the splitting of CU hierarchical tree is done, each CU is subject to further split into one or more Prediction Units (PUs) according to a PU partition type for prediction. Each CU is split into one, two, or four PUs according to one of eight PU partition types defined in the HEVC standard. The PU, together with the associated CU syntax, works as a basic representative block for sharing the prediction information as the same prediction process is applied to all pixels in the PU and prediction relevant information is conveying to the decoder on a PU basis. A specified prediction process is employed to predict the values of associated pixel samples inside the PU. After the prediction process, residues belong to a CU are split into one or more Transform Units (TUs) according to a Residual QuadTree (RQT) block partitioning structure for transforming the residues into transform coefficients for compact data representation. For each TU, a transform matrix having the same size as the TU is applied to the residues to generate the transform coefficients, and these transform coefficients are quantized and conveyed to the decoder on a TU basis. A transform unit is composed of a Transform Block (TB) of luminance (luma) samples of size 8×8, 16×16, or 32×32, and two corresponding transform blocks of chrominance (chroma) samples in a picture coded according to a 4:2:0 colour sampling format. An integer transform is applied to a transform block and the level values of the quantized coefficients together with the other side information are entropy coded in the video bitstream.

The terms Coding Tree Block (CTB), Coding block (CB), Prediction Block (PB), and Transform Block (TB) are defined to specify two-dimensional sample array of one color component associated with the CTU, CU, PU, and TU respectively. For example, a CTU consists of one luma CTB, two chroma CTBs, and its associated syntax elements. In the HEVC system, the same quadtree block partitioning structure is generally applied to both luma and chroma components unless a minimum size for chroma block is reached. However, in the upcoming emerging video coding standard, the luma component and the chroma components may be coded using the same block partitioning structure, or different block partitioning structures. The same block partitioning structure is also referred to as using a single splitting tree or single tree block partitioning while different block partitioning structures is referred to as using different splitting trees or dual tree block partitioning.

Current Picture Referencing

Inter prediction or motion compensation, including Inter mode, Merge mode, and Skip mode, is designed to exploit temporal correlations between a current picture and one or more reference pictures. A Motion Vector (MV) is used to represent a displacement between a current block in a current picture and a corresponding reference block in a reference picture. It is generally assumed that patterns corresponding to objects or background in a current picture are displaced to form corresponding objects on subsequent pictures or correlated with other patterns within the current picture. With the estimation of such a displacement from other pictures, such as using block matching techniques, the patterns could be mostly reproduced without re-coding the patterns. Similarly, block matching may be performed within the same picture to select a reference block. Block matching search in the current picture is similar to the block matching process in inter prediction, a motion vector is used to represent a displacement between a current block in the current picture and a corresponding reference block in the current picture. The corresponding reference block is a previously reconstructed block within the same picture as the current block. This technique is called Intra Block Copy (IBC) or Current Picture Referencing (CPR). CPR was observed to be not efficient when applying to camera captured video contents. One of the reasons is that textual patterns in a spatial neighboring area may be similar to a current coding block but usually with some gradual changes over space. It is difficult for a block to find an exact match within the same picture in camera captured video, so the improvement in coding performance is limited. However, CPR is a very effective technique to encode screen contents by searching a similar pattern in the current picture. For a typical video with text and graphics, there are usually repetitive patterns within the same picture. To process a current block in a current picture by the CPR mode, the current block is predicted from a previously reconstructed block within the current picture. A motion vector, also called a Block Vector (BV) is used to signal a relative displacement from the position of the current block to that of a reference block. Prediction errors are then coded using transformation, quantization, and entropy coding. An example of using CPR compensation in screen content coding is illustrated in FIG. 1. Reference samples in a reference block derived from a BV correspond to reconstructed samples of the current decoded picture prior to in-loop filter operations, such as both deblocking and Sample Adaptive Offset (SAO) filters in the HEVC standard.

A first version of CPR compensation was limited to be searched within a small local area with only 1 dimensional MV and only for blocks with a size of 2N×2N. A more advanced CPR design was later developed. A few bitstream conformance constraints are imposed to regulate a valid CPR MV value of a current PU in the more advance CPR design.

Adaptive Colour Transform

Most of the screen contents are captured in the RGB colour space instead of YCbCr colour space. For each image block in the RGB colour space, there is usually a strong correlation among different colour components such that a colour space conversion is useful for removing inter-colour component redundancy. The colour space conversion simply transforms pixels in the RGB colour space into pixels in the YCoCg colour space. The YCoCg colour space is a simple transformation of the associated RGB colour space into a luma value Y and two chroma values Co (Chrominance orange) and Cg (Chrominance green). The terms colour space conversion and colour transform are identical and may be used interchangeably in the specification. The colour space conversion transforms pixels from the RGB colour space to the YCoCg colour space according to the following equation.

$$\begin{bmatrix} Y \\ C_o \\ C_g \end{bmatrix} = \begin{bmatrix} 1/4 & 1/2 & 1/4 \\ 1/2 & 0 & -1/2 \\ -1/4 & 1/2 & -1/4 \end{bmatrix} \begin{bmatrix} R \\ G \\ B \end{bmatrix}$$

However, there may be many image blocks in screen content video containing different features having very saturated colours, which leads to less correlation among the three colour components. For those blocks having very saturated colours, coding directly in the RGB colour space is more effective than transforming into the YCoCg colour space. An Adaptive Colour Transform (ACT) technique is proposed to adaptively apply the colour space conversion to image blocks. In an implementation of the ACT technique, both an input data of an image block and its corresponding predictor use the same colour space conversion when ACT is applied to the image block. Since this colour space conversion is linear, it is identical to apply the colour space conversion to residues in the spatial domain while the prediction operation is performed in a different colour space. In another implementation of the ACT technique, the colour space conversion is applied on the residues, which makes the prediction operation for different colour components independent. In one restriction of ACT, the colour transform is not allowed to be used for intra-coded blocks when intra prediction directions for different colour components are not the same. It is because the correlation among co-located samples across colour components is decreased when the intra prediction directions are different, making the colour transform less effective. The colour transform also changes the norm of different components. To normalize errors in different colour spaces, a set of Quantization Parameter (QP) offsets (−5, −5, −3) is applied to three colour components of an image block during the quantization operation when ACT is applied to the image block. After the quantization and reconstruction operations, an inverse colour transform operation is applied to the quantized residues of the image block so that the reconstruction operation is still kept in the input colour space.

BRIEF SUMMARY OF THE INVENTION

Methods and apparatuses for processing video data with Adaptive Colour Transform (ACT) are disclosed. Embodiments of a video coding system implementing the video processing methods receive input data associated with a current block in a current picture, determines if a luma component and chroma components of the current block are coded using different splitting trees, determines to disable ACT on the current block when the luma component and chroma components are coded using different splitting trees, and encodes or decodes the current block. A colour space of the current block is converted to another colour space when ACT is performed on the current block. In some embodiments, the video coding system sets or inferred an ACT flag of the current block to be false when the luma component and chroma components of the current block are coded using different splitting trees. The ACT flag is not signaled in or parsed from the video bitstream for blocks coded using dual tree block partitioning according to an embodiment. The video coding system only signals or parses the ACT flag when the current block is coded using single tree block partitioning according to this embodiment.

In some embodiments of applying ACT to transform the colour space of residues, the video processing method for a video encoding system further comprises predicting the current block to generate a predictor, generating residues of the current block from the predictor, determining whether to perform ACT on the current block when the luma component and the chroma components of the current block are coded using a single splitting tree, and converting a RGB colour space of the residues of the current block to an YCoCg colour space when performing ACT on the current block. The step of determining whether to perform ACT on the current block may further comprise determining if the current block is predicted by intra prediction and disable ACT on the current block when the current block is not predicted by intra prediction. In one embodiment, the video encoding system determines whether intra prediction directions for the luma component and chroma components are different when the current block is predicted by intra prediction, and disables ACT on the current block when the intra prediction directions for the luma component and the chroma components are different. In some embodiments of applying ACT on residues, the video processing method for a video decoding system further comprises recovering residues of the current block by decoding the current block, determining whether ACT is applied to the current block when the luma component and the chroma components of the current block are coded using a single splitting tree, and converting a YCoCg colour space of the recovered residues of the current block to a RGB colour space when ACT is applied to the current block. The step of determining whether ACT is performed on the current block may further comprise determining if the current block is predicted by intra prediction, and disable ACT on the current block when the current block is not predicted by intra prediction. In one embodiment, the video decoding system further parses an ACT flag of the current block when the current block is predicted by intra prediction and is coded using a single splitting tree, and determines whether ACT is applied to the current block according to the ACT flag of the current block. The video decoding system may also parses a high-level ACT flag from a SPS or Picture Parameter Set (PPS) corresponding to the current picture, and the step of determining whether ACT is applied to the current block is performed only when the high-level ACT flag is true and the luma component and chroma components of the current block are coded using a single splitting tree. ACT is disabled on any block in the current picture when the high-level ACT flag is false.

In some embodiments of applying ACT on input data and predictors, the video processing method for a video encoding system further comprises determining whether to perform ACT on the current block when the luma component and the chroma components of the current block are coded using a single splitting tree, predicting the current block to generate a predictor, and converting a RGB colour space of the input data and predictor of the current block to a YCoCg colour space when ACT is performed on the current block. In one embodiment, the video encoding system further comprises determining if the current block is predicted by intra prediction, and disabling ACT on the current block when the current block is not predicted by intra prediction. The video encoding system may further determines whether intra prediction directions for the luma component and the chroma components are different when the current block is predicted by intra predictions, and disable ACT on the current block when the intra prediction directions for the luma and chroma components are different. In some embodiments of applying ACT on the input data and predictor, the video processing method for a video decoding system further comprises recovering residues of the current block by decoding the current block, predicting the current block to generate a predictor, and determining whether ACT is applied to the current block when the luma component and the chroma components of the current block are coded using a single splitting tree. The video decoding system converts a RGB colour space of the predictor to an YCoCg colour space, reconstructs the current block using the converted predictor and the recovered residues, and converts the YCoCg colour space of the reconstructed current block to the RGB colour space when ACT is applied to the current block. The video decoding system reconstructs the current block using the predictor and the recovered residues when ACT is not applied to the current block. The step of determining whether ACT is applied to the current block may further comprise determining if the current block is predicted by intra prediction and disabling ACT on the current block when the current block is not predicted by intra prediction. In one embodiment, the video decoding system parses an ACT flag of the current block when the current block is predicted by intra prediction and is coded using a single splitting tree, and determines whether ACT is applied to the current block according to the ACT flag of the current block. The video decoding system may parse a high-level ACT flag from a SPS or PPS corresponding to the current picture, and the step of determining whether ACT is applied to the current block is only performed when the high-level ACT flag is true and the luma component and the chroma components of the current block are coded using a single splitting tree. ACT is disabled on any block in the current picture when the high-level ACT flag is false.

Aspects of the disclosure further provide an apparatus in a video coding system, and the apparatus comprises one or more electronic circuits configured for receiving input data associated with a current block in the current picture, determining if a luma component and chroma components of the current block are coded using different splitting trees, determining to disable ACT on the current block when the luma component and the chroma components of the current block are coded using different splitting trees, and encoding or decoding the current block.

Aspects of the disclosure further provide a non-transitory computer readable medium storing program instructions for causing a processing circuit of an apparatus to encode or decode video data of a current block by disabling ACT when luma and chroma components are coded using different splitting trees. Other aspects and features of the invention will become apparent to those with ordinary skill in the art upon review of the following descriptions of specific embodiments.

BRIEF DESCRIPTION OF THE DRAWINGS

Various embodiments of this disclosure that are proposed as examples will be described in detail with reference to the following figures, wherein like numerals reference like elements, and wherein:

FIG. 1 illustrates an example of current picture referencing compensation for screen content coding.

DETAILED DESCRIPTION OF THE INVENTION

Figure 2:
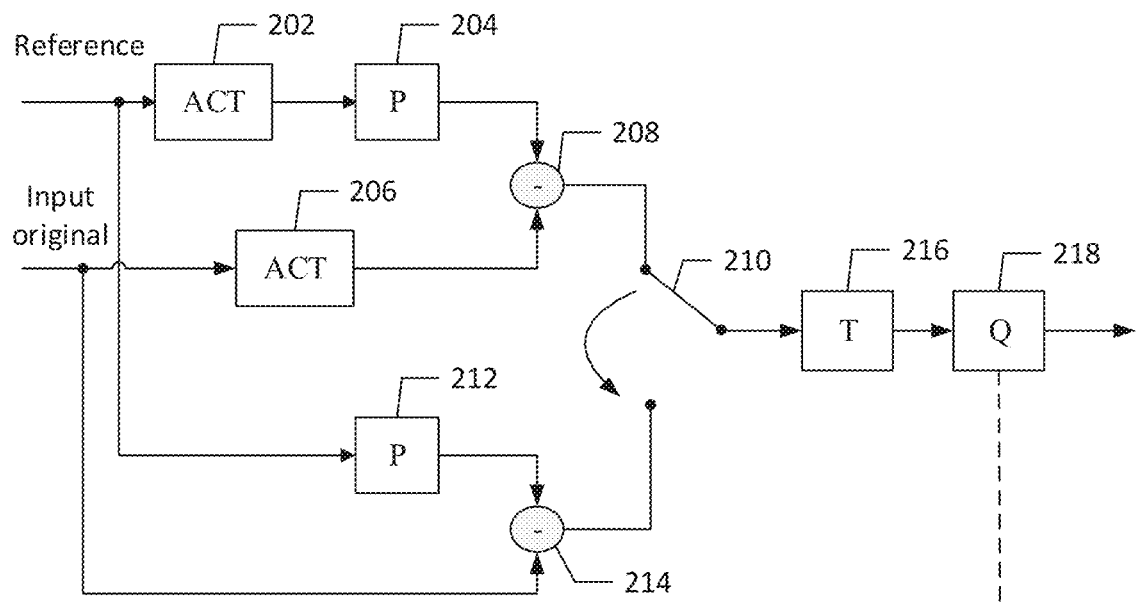
FIG. 2 illustrates a block diagram of a video encoder and video decoder implementing adaptive colour transform before prediction according to an embodiment of the present invention.
Figure 2:
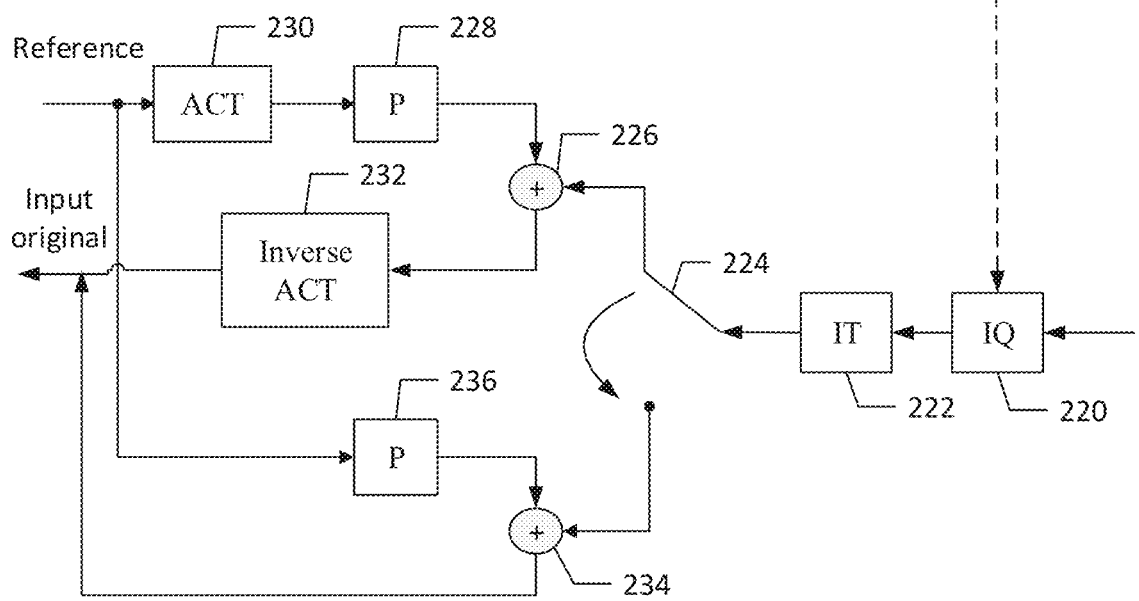

It will be readily understood that various modules of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

Various embodiments of the present invention improve the coding efficiency of the Adaptive Colour Transform (ACT) coding tool or the Current Picture Referencing (CPR) coding tool. Some embodiments consider various scenarios of applying ACT or CPR on blocks coded using dual-tree block partitioning or single-tree block partitioning.

Disable Adaptive Colour Transform for Dual Tree Block Partitioning

The luma and chroma components are coded using different CU splitting trees when dual tree block partitioning is used, and according to various embodiments of the present invention, ACT will be disabled forcedly for blocks coded in dual tree block partitioning. The ACT coding tool requires information from all three colour components for colour conversion from one colour space to another colour space, but the luma and chroma components are predicted separately with different CU splitting trees when dual tree block partitioning is used. Exemplary embodiments of the present invention exclusive the use of the ACT coding tool and dual tree block partitioning by implementing the ACT coding tool with a dual tree constraint. In some embodiments of the present invention, it is a bitstream conformance requirement that an ACT flag shall be false when dual tree block partitioning is used. The ACT flag(s) may be inferred to be false or forced to be false for blocks coded in dual tree block partitioning. In some embodiments, a high-level ACT flag is transmitted in a sequence level, such as in a Sequence Parameter Set (SPS), or a picture level, such as Picture Parameter Set (PPS), indicating whether ACT is enabled or disabled for the sequence or picture. For example, ACT is disabled in the entire sequence or picture if the high-level ACT flag is false whereas one or more block-level ACT flags are transmitted indicating whether ACT is enabled or disabled for the one or more blocks in the sequence or picture if the high-level ACT flag is true. In one embodiment, a high-level ACT flag is transmitted in or parsed from a SPS for a current sequence, and when the high-level ACT flag is true and a current block in the current sequence is split using single tree block partitioning, a block-level ACT flag is transmitted or parsed for the current block indicating whether the current block is coded using colour transform. The block-level ACT flag is not transmitted or parsed for all blocks in the current sequence when the high-level ACT flag is false as adaptive colour transform is not performed on any of the blocks in the current sequence. The video decoder may infer all the block-level ACT flags for the blocks in the current sequence to be false once the high-level ACT flag is false. In this embodiment, the block-level ACT flag is not transmitted or parsed for the current block when the current block is coded using dual tree block partitioning. The video encoder sets the block-level ACT flag to be false when the current block is coded using dual tree block partitioning. The video decoder infers the block-level ACT flag to be false when the current block is coded using dual tree block partitioning.

In another embodiment, if ACT is enabled in a current sequence or picture according to a high-level ACT flag transmitted in a SPS or PPS, the video data in the current sequence or picture has to be coded in single tree block partitioning as the luma and chroma components cannot be coded using different CU splitting trees. In another embodiment, dual tree block partitioning is constrained based on an input colour format. For example, when a colour format of to-be-encoded sequences is non-Y-Cb-Cr format, such as the RGB format, the luma and chroma components of the to-be-encoded sequences cannot be coded using different CU splitting trees. In the above embodiments, a bitstream conformance constraint may be imposed to avoid using different CU splitting trees to split the luma and chroma components, which implies a separate tree flag shall be false, when ACT is enabled or when the input colour format is not YCbCr format. The separate tree flag may still be signaled in the video bitstream but forced to be false, or the separate tree flag is not signaled and inferred to be false. Single tree block partitioning is then used and shared between the luma and chroma components when the separate tree flag is false.

First Implementation Scheme of ACT with Dual Tree Constraint

FIG. 2 illustrates a block diagram of an embodiment of implementing ACT with the dual tree constraint in a video encoder and decoder according to a first implementation scheme. In the first implementation scheme, ACT is performed before prediction and after pixel reconstruction. Exemplary embodiments of the present invention restrict blocks split using dual tree block partitioning to be coded with colour transform as ACT is only applied to blocks split using single tree block partitioning. For example, a video encoder only signals a block-level ACT flag for a current block if a high-level ACT flag is true and single tree block partitioning is used to split the current block. The current block is converted by colour transform if the block-level ACT flag is true, whereas ACT is disabled for the current block if the block-level ACT flag is false or if this block-level ACT flag is not signaled. Similarly, a video decoder only parses a block-level ACT flag for a current block if a high-level ACT flag is true and the current block is split from single tree block partitioning. According to the first implementation scheme of ACT, when a current block is split from single tree block partitioning and is determined to be coded with ACT, the colour space of input original data of the current block is converted by an ACT module 206, and the colour space of reference data is also converted by an ACT module 202 before generating a predictor for the current block by a Prediction (P) module 204. A subtraction module 208 generates residues of the current block by subtracting the converted original data and the predictor. If the current block is not to be coded with ACT, for example, when the current block is split from dual tree block partitioning or when the video encoder determines not perform ACT on the current block, a Prediction (P) module 212 generates a predictor for the current block and the predictor is subtracted from the input original data of the current block by the subtraction module 214 to generate residues of the current block. A Switch 210 selects an output from the subtraction module 208 if the current block is coded with ACT or an output from the subtraction module 214 if the current block is not coded with ACT. A Transform (T) module 216 followed by a Quantization (Q) module 218 conduct a transform operation and a quantization operation on the residues of the current block to generate coefficients. The lower part of FIG. 2 illustrates a reconstruction process of the video encoder as well as the video decoder. The coefficients of the current block are processed by an Inverse Quantization (IQ) module 220 and an Inverse Transform (IT) module 222 to reconstruct the residues of the current block. A Switch 224 selects an upper Adder 226 if the current block is coded with ACT or a lower Adder 234 if the current block is not coded with ACT. For example, the current block is coded with ACT only when a block-level ACT flag for the current block is true. In some embodiments of the present invention, the current block is not coded with ACT if the tree type for splitting the current block is dual tree block partitioning. The colour space of the reference data is converted by an ACT module 230 before sent it to a Prediction (P) module 228 when the current block is coded with ACT. The residues of the current block are added to a predictor generated by the Prediction module 228 and then the reconstructed data of the current block are converted back to an original colour space by an Inverse ACT module 232. When the current block is not coded with ACT, the residues of the current block are directly added to a predictor generated by a Prediction (P) module 236 using the lower Adder 234 to recover reconstructed data of the current block.

In some embodiments of the first implementation scheme, ACT is only applied to intra blocks. The video encoder determines if a current block is predicted by intra prediction, and disables ACT on the current block when the current block is not predicted by intra prediction. In one embodiments, the video encoder only transmits a block-level ACT flag for a current block indicating whether the current block is coded using colour transform when the current block is predicted by intra prediction and the luma component and chroma components of the current block are coded by a single splitting tree. In this embodiment, the video decoder disables ACT on the current block when the current block is not predicted by intra prediction, and the video decoder parses a block-level ACT flag for a current block only when the current block is predicted by intra prediction and the luma component and chroma components of the current block are coded by a single splitting tree. The video decoder determines whether ACT is applied to the current block according to the block-level ACT flag for the current block. In one embodiment, the video encoder further determines whether intra prediction directions for the luma component and chroma components are different when the current block is predicted by intra prediction, and disables ACT on the current block when the intra prediction directions for the luma component and chroma components are different.

Figure 3:
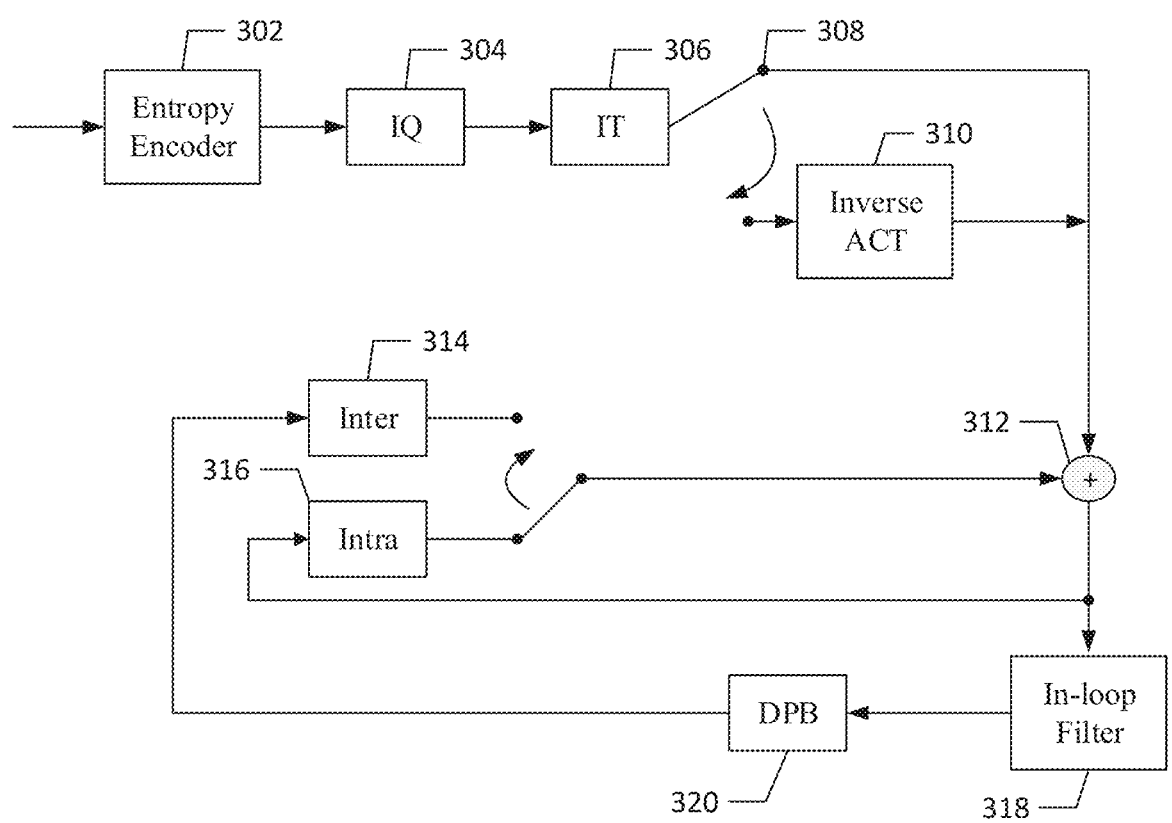
FIG. 3 illustrates a block diagram of a video decoder with adaptive colour transform applied to residues according to an embodiment of the present invention.

Second Implementation Scheme of ACT with Dual Tree Constraint FIG. 3 illustrates a block diagram of an embodiment of implementing ACT with the dual tree constraint in a video decoder according to a second implementation scheme. In the second implementation scheme, ACT is applied in the residual domain to convert the colour space from RGB to YCoCg. In the embodiment as shown in FIG. 3, ACT is only permitted to be performed on blocks split from single tree block partitioning. For example, a block-level ACT flag is signaled for a current CU if a high-level ACT flag is true and single tree block partitioning is used to split the current CU. The colour space of residues of the current CU is converted by colour transform when the block-level ACT flag for the current CU is true. ACT is disabled for the current CU if the block-level ACT flag for the current CU is false or if the block-level ACT flag is not signaled for the current CU. In this embodiment, the video decoder of FIG. 3 parses a high-level ACT flag from SPS or PPS, and if the high-level ACT flag is true, the video decoder further parses a block-level ACT flag for each block split from single tree block partitioning. In a specific embodiment, ACT is only applied to residues of intra coded blocks as residues resulted from the intra prediction mode are assumed to be much larger than residues resulted from the inter prediction mode. Predictors of luma and chroma components in the intra prediction mode may be different, and high-correlation information may be merged by applying ACT to transform RGB to YCoCg. The video decoder of this specific embodiment only needs to parse the block-level ACT flag for each intra coded block split from single tree block partitioning when the high-level ACT flag is true, and determines whether ACT is applied according to the block-level ACT flag. That is, the video decoder disables ACT on blocks not predicted by intra prediction without parsing block-level ACT flags. In FIG. 3, entropy decoding module 302 decodes coefficient levels of a current block, and an Inverse Quantization (IQ) module 304 and an Inverse Transform (IT) module 306 de-quantizes then inverse transform the coefficient levels to recover the residues of the current block. The entropy decoding module 302 parses a block-level ACT flag for the current block if the tree type is single tree block partitioning and a corresponding high-level ACT flag is true. The residues of the current block are processed by an Inverse ACT module 310 if the block-level ACT flag for the current block is true; otherwise the residues of the current block are directly sent to an Adder 312 through a Switch 308. The colour space of the residues was converted from RGB to YCoCg at the video encoder, so the Inverse ACT module 310 converted it back to RGB for reconstruction. A predictor for the current block is generated from an Inter prediction module 314 or an Intra prediction module 316 and added to the residues of the current block at an Adder 312 to reconstruct the current block. The reconstructed current block is processed by an In-loop filter 318 to enhance image quality. The filtered picture is then stored in a Decoded Picture Block (DPC) 320 to be referenced by the Inter prediction module 314.

Separate CPR Coding for Luma and Chroma

The following embodiments are related to methods and apparatuses implementing the CPR coding tool. In some embodiments, separate CPR coding is used for luma and chroma components when the luma and chroma components are coded using different CU splitting trees. Two CPR enable flags CPR_enable_flag are always signaled for the luma and chroma components respectively according to some embodiments. In some other embodiments, one CPR enable flag CPR_enable_flag is always signaled for the chroma components of a current CU or PU to indicate whether the current component of the current CU or PU is coded with the CPR coding tool. In one embodiment, the CPR_enable_flag of chroma components of a current CU or PU depends on a collocated luma CU or PU, for example, the luma component is coded before the chroma components, and if a collocated luma CU or PU is not coded with CPR, an encoder constraint is applied to chroma component coding to force the CPR_enable_flag of the chroma components to be zero. It is a bitstream conformance requirement that if the collocated luma CU or PU is not coded with CPR, the CPR_enable_flag for the chroma components shall be zero. In another embodiment where luma CPR information is reused for chroma components, a CPR_enable_flag for the chroma components is still signaled but forced to be zero if the collocated luma CU or PU is not coded with CPR. An embodiment of the collocated CU or PU of a current chroma block includes all the luma CUs in the collocated regions of the current chroma block. For example, the CPR_enable_flag for the chroma components of a current chroma block is constrained to be zero if one of the luma CUs in the collocated region of the current chroma block is not coded in the CPR mode. In another embodiment, only one or partial luma CUs/sub-blocks/pixels are checked. For example, only the luma CU that covers the center or top-left pixel of the collocated region of the current chroma block, or the luma CUs that cover the center and four corner pixels of the collocated region of the current chroma block are checked. If one of these checked CUs is not coded in the CPR mode, the CPR_enable_flag for the chroma components is constrained to be zero. In yet another embodiment, the CPR_enable_flag is constrained to be zero only if all the checked CUs are not coded in the CPR mode.

The CPR_enable_flag may be signaled before or after signaling the skip_flag for the Skip mode, or before or after signaling the merge flag for the Merge mode, or after signaling the prediction mode. If the CPR_enable_flag is zero (i.e. false), the CPR coding tool is disabled for this chroma block, and syntaxes for the CPR mode can be skipped and inferred as predefined values. If the CPR_enable_flag is true, the syntaxes for the CPR mode can be signaled.

In another embodiment, a CPR_reuse_flag is signaled for chroma components to indicate whether the current chroma CU or PU is coded with the CPR mode. In one embodiment, an encoder constraint is applied on the chroma components to force the CPR_reuse_flag for the chroma components to be zero if the luma component is coded before the chroma components and the collocated luma CU or PU is not coded with CPR. It is a bitstream conformance requirement that if the collocated luma CU or PU is not coded with CPR, the CPR_reuse_flag for the chroma components shall be zero. In another embodiment where luma CPR information is resused for the chroma components, if the collocated luma CU or PU is not coded with CPR, a CPR_reuse_flag for the chroma components is still signaled but forced to be zero. An embodiment of the collocated luma CU or PU of a current chroma block includes all the luma CUs in the collocated region of the current chroma block. For example, if one of the luma CUs in this collocated region is not coded in the CPR mode, the CPR_reuse_flag is constrained to be zero. In another embodiment, only one or partial luma CUs/sub-blocks/pixels are checked. For example, only the luma CU that covers the center or top-left pixel of the collocated region of the current chroma block or the luma CUs that cover the center and four corner pixels of the collocated region of the current chroma block are checked. If one of the checked CUs is not coded in the CPR mode, the CPR_reuse_flag is constrained to be zero according to one embodiment. In another embodiment, the CPR_reuse_flag is constrained to be zero only if all of the checked CUs are not coded in the CPR mode.

The CPR_reuse_flag can be signaled before or after signaling the skip_flag for the Skip mode, or before or after signaling the merge flag for the Merge mode, or after signaling the prediction mode. The collocated luma CPR Motion Vector (MV) can be scaled to be the chroma CPR MV for the chroma block if the CPR_reuse_flag is true. In one embodiment, the non-sub-block CPR mode is used. Only one CPR MV is signaled or inferred for a chroma block. The CPR MV may be signaled using the Merge mode or Inter mode, or inferred by reusing one scaled collocated luma CPR MV. In another embodiment, the sub-block CPR mode is used. The chroma block is divided into several sub-blocks. The sub-block size is N×M, where N and M can be 1, 2, 4, 8, or any integer. In some embodiments, N and M can be CU size, width, height, shape, or depth dependent. For each sub-block, a collocated luma CPR MV is derived. The luma CPR MV can be scaled as the CPR MV for the chroma sub-block. If the CPR_reuse_flag is zero, intra chroma mode signaling is used. The CPR mode can also be used or signaled for the current chroma block. The signaled MV can be independent to the collocated luma CPR MV.

In another embodiment, one candidate is inserted in a candidate list and if the candidate is selected, luma CPR information is reused for the chroma block. Some embodiments of the candidate list are the Merge candidate list, the CPR candidate list, Intra mode list, or chroma mode list. The luma CPR information may include the block vector or the CPR MV of a point, a CU, a region, or each sub-block. The candidate may be placed in a first position of the candidate list. If this candidate is selected, the collocated luma CPR MV can be scaled to be the chroma CPR MV for the chroma block. In one embodiment, the non-sub-block CPR mode is used. Only one CPR MV is signaled or inferred for this chroma block. For example, the CPR MV is signaled using the Merge mode or Inter mode signaling method or the CPR MV is inferred by reusing one scaled collocated luma CPR mV. In another embodiment, the sub-block CPR mode is used. The chroma block is divided into several sub-blocks with a sub-block size equal to N×M, where N and M can be 1, 2, 4, 8, or any integer. N and M can be CU size, width, height, shape, or depth dependent. For each sub-block, a collocated luma CPR MV is derived, and the luma CPR MV can be scaled as the CPR MV for the chroma sub-block. If the collocated luma CU or sub-block is not coded in the CPR mode, a predefined CPR MV or any CPR MV that derived from the CU width, height, area, size, shape, or depth, or a derived CPR MV is used. Some examples of the predefined CPR MV are (−width, 0), (−2*width, 0), (0, height), (0, 2*height), and (−width, −height). The derived CPR MV can be derived from a neighboring chroma CPR MV or the collocated neighboring luma CPR MV.

Chroma Direct Mode for CPR CU

Direct Mode (DM) for a current chroma block is an inherited mode from a collocated luma block. The intra prediction mode of the current chroma block is directly inherited from the luma intra prediction mode if DM is selected as the prediction mode for the current chroma block. Besides the intra prediction mode derived from DM, several neighboring modes around the DM mode or some predefined modes are added into a chroma mode list with a corresponding pruning process. In order to improve chroma DM, not only the intra prediction mode is inherited from the luma component, but also using chroma DM represents the inheritance of CPR information from the collocated luma CU or PU for the chroma CU or PU. In one embodiment, if a chroma CU/PU is coded with DM and its collocated luma CU or PU is coded with the CPR mode, the scaled MV from the collocated luma CU or PU can be directly used for the chroma CU or PU. If the chroma CU or PU is coded with DM and its collocated luma CU or PU is not coded with the CPR mode, the luma intra prediction mode is used for the current chroma CU or PU. In another embodiment, DM is also used to represent the inheritance of CPR information from the luma component, and the pruning process related to DM is removed when constructing the chroma mode list. In one embodiment, the chroma block is divided into several sub-blocks. The sub-block size is N×M, where N and M can be 1, 2, 4, 8, or any integer. N and M can be CU size, width, height, shape, or depth dependent. For each sub-block, the method mentioned above is used for inheriting chroma information from corresponding luma information.

Chroma Sub-Block Direct Mode in Separate Tree

A sub-block Direct Mode (DM) may be used to encode or decode chroma blocks in some embodiments. A syntax element of sub block DM mod flag is signaled to indicate whether the sub-block DM mode is used, or one candidate is inserted in a candidate list and the sub-block DM mode is used when the candidate is selected. Some examples of the candidate list are the Merge candidate list, CPR candidate list, Intra mode list, chroma Intra mode list, and chroma DM mode list. If the sub-block DM mode is used in a chroma block, the chroma block is divided into several sub-blocks. Each sub-block has a size of N×M, where N and M can be 1, 2, 4, 8, or any integer. N and M can be CU size, width, height, shape, or depth dependent. For each sub-block, a collocated luma block or collocated luma sub-block is derived. A collocated luma CPR MV is derived if the collocated luma block or sub-block is coded in the CPR mode. The luma CPR MV can be scaled as the CPR MV for the chroma sub-block. If the collocated luma block or sub-block is not coded in the CPR mode, the luma intra mode can be used for the chroma sub-block. In another example, if the collocated luma block or sub-block is not coded in the CPR mode, the chroma sub-block is coded using the Linear Mode (LM). In another example, if the collocated luma CU or sub-block is not coded in the CPR mode, a predefined CPR MV, any CPR MV derived from the CU width, height, area, size, shape, or depth, or a derived CPR MV is used. An example of the predefined CPR MV is (−width, −height), where width is the CU width and height is the CU height of the chroma CU. The derived CPR MV can be derived from a neighboring chroma CPR MV or the collocated neighboring luma CPR MV.

Implementation of Chroma DM/LM Mode in Separate Tree

In one embodiment, a current chroma block is divided into several chroma sub-blocks if the sub-block DM mode is used to code the current chroma block. The sub-block size of the chroma sub-blocks can be N×M, where N and M can be 1, 2, 4, 8, or any integer. N and M can be CU size, width, height, shape, or depth dependent. For each chroma sub-block, a collocated luma block or sub-block is derived. If the collocated luma block or sub-block is coded in the CPR mode, a collocated luma CPR MV is derived. The luma CPR MV can be scaled as the CPR MV for the chroma sub-block. If the collocated luma block or sub-block is not coded in the CPR mode, the luma intra mode can be used to code the chroma sub-block. Instead of referring neighboring samples of a chroma sub-block, neighboring samples of the current chroma block are used to predict the chroma sub-block in the current chroma block if the collocated luma block or sub-block of the chroma sub-block is not coded in the CPR mode. In another embodiment, if the sub-block LM mode is used and a collocated luma block or sub-block of a chroma sub-block is not coded in the CPR mode, the LM mode is used to predict the chroma sub-block. Instead of referring neighboring samples of a chroma sub-block in a current block, neighboring samples of the current chroma block are referred to predict the chroma sub-block when the collocated luma block or sub-block is not coded in the CPR mode. In one embodiment, the same prediction mode can be assigned for all the chroma sub-blocks in the current block. For example, the same prediction mode may be the CPR mode, DM mode, or LM mode. In another embodiment, each chroma sub-block in the current chroma block can be coded in different prediction modes. The prediction modes can be referenced by the neighboring blocks.

Chroma Sub-Block Mode in Separate Tree

In some embodiments, a sub-block DM mode may be used to encode or decode chroma blocks. Syntax of sub_block_DM_mode_flag is signaled to indicate whether the sub-block DM mode is enabled, and the sub-block DM mode is used if this sub_block_DM_mode_flag is true according to an embodiment. In another embodiment, one candidate is inserted in a candidate list and the sub-block DM mode is used when this candidate is selected. Some examples of the candidate list are the Merge candidate list, CPR candidate list, intra mode list, chroma intra mode list, or chroma DM mode list. In cases when the sub-block DM mode is used to code a chroma block, the chroma block is divided into several chroma sub-blocks. The sub-block size can be N×M, where N and M can be 1, 2, 4, 8, or any integer. N and M can be CU size, width, height, shape, or depth dependent. For each chroma sub-block in a current chroma block, a collocated luma block or sub-block is derived. If the collocated luma block or sub-block is not coded in the CPR mode or if the collocated luma block or sub-block is coded in the CPR mode but the collocated luma Block Vector (BV) is not valid, the luma intra mode is used for the chroma sub-block. For example, the collocated luma block or sub-block is coded in the CPR mode. After the luma CPR MV being scaled as the CPR MV for the chroma sub-block, a fractional MV is generated. In the motion compensation process engaging the fractional MV, some addition samples are needed for fractional interpolation. For example, two additional samples are needed for interpolation when a 4-tap filter is used in the interpolation process. These additional samples may be unavailable samples, for example, samples outside of a picture boundary, outside of a CTU boundary, outside of a CTU row, outside of Wavefront Parallel Process (WPP), overlapped with the current chroma block, or outside an available reference sample region. In another example, the collocated luma block or sub-block of a chroma sub-block in a current chroma block is coded in the CPR mode, and the luma CPR MV is scaled as the CPR MV for the chroma sub-block. However, the scaled CPR MV may refer to a region overlapped with the current chroma block. The scaled CPR MV is modified so that the reference block is in the available reference sample region if the scaled CPR MV refers to any unavailable sample. The modified CPR MV is the chroma CPR MV for the chroma sub-block. For example, the MV can be shifted horizontally, vertically, or both horizontally and vertically to make all reference samples available. In another embodiment, if the collocated luma block or sub-block of a chroma sub-block is not coded in the CPR mode or if the collocated luma block or sub-block is coded in the CPR mode but the collocated luma BV is not valid, the LM mode is used for the chroma sub-block. In another embodiment, if the collocated luma CU or sub-block of a chroma sub-block is not coded in the CPR mode, or if the collocated luma CU or sub-block is coded in the CPR mode but the collocated luma BV is not valid, a predefined CPR MV, or any CPR MV that derived from the CU width, height, area, size, shape, or depth, or a derived CPR MV is used. Some examples of the predefined CPR MV are (−width, 0), (−2*width, 0), (0, height), (0, 2*height), (−width, −height). The derived CPR MV can be derived from a neighboring chroma CPR MV or a collocated neighboring luma CPR MV.

Default MV in Merge Mode and Inter Mode

In Merge mode and Inter mode Motion Vector Predictor (MVP) candidate list generation, if all reference pictures in a candidate list are the current picture, one or more predefined CPR candidates are used to fill the candidate list if the candidate list is not full. All the reference pictures are the current picture when all the reference pictures in reference list 0 and reference list 1 are the current picture, or when the target reference picture in Inter mode is the current picture. Some examples of the predefined CPR MV are (−width, 0), (−2*width, 0), (0, height), (0, 2*height), (−width, −height), and (X, Y), where X and Y are derived from the width, height, area, size, shape, or depth of the current block. In Merge mode, a uni-prediction predefined CPR can be filled. The reference picture is the current picture. The prediction flag of the reference list that contains the current picture is true. The predefined MV to fill the candidate list is (0, 0) if not all the reference pictures are the current picture.

In another embodiment, in Inter mode MVP candidate derivation or CPR inter mode MVP candidate derivation, if the selected reference picture is the current picture, one or more predefined CPR candidates are used to fill the candidate list when the candidate list is not full. Some examples of the predefined CPR MV are (−width, 0), (−2*width, 0), (0, height), (0, 2*height), (−width, −height), and (X, Y), where X and Y are derived from the width, height, area, size, shape, or depth of the current block. The predefined MV to fill the candidate list is (0, 0) if the selected reference picture is not the current picture.

Representative Flowcharts for Embodiments

Figure 4:
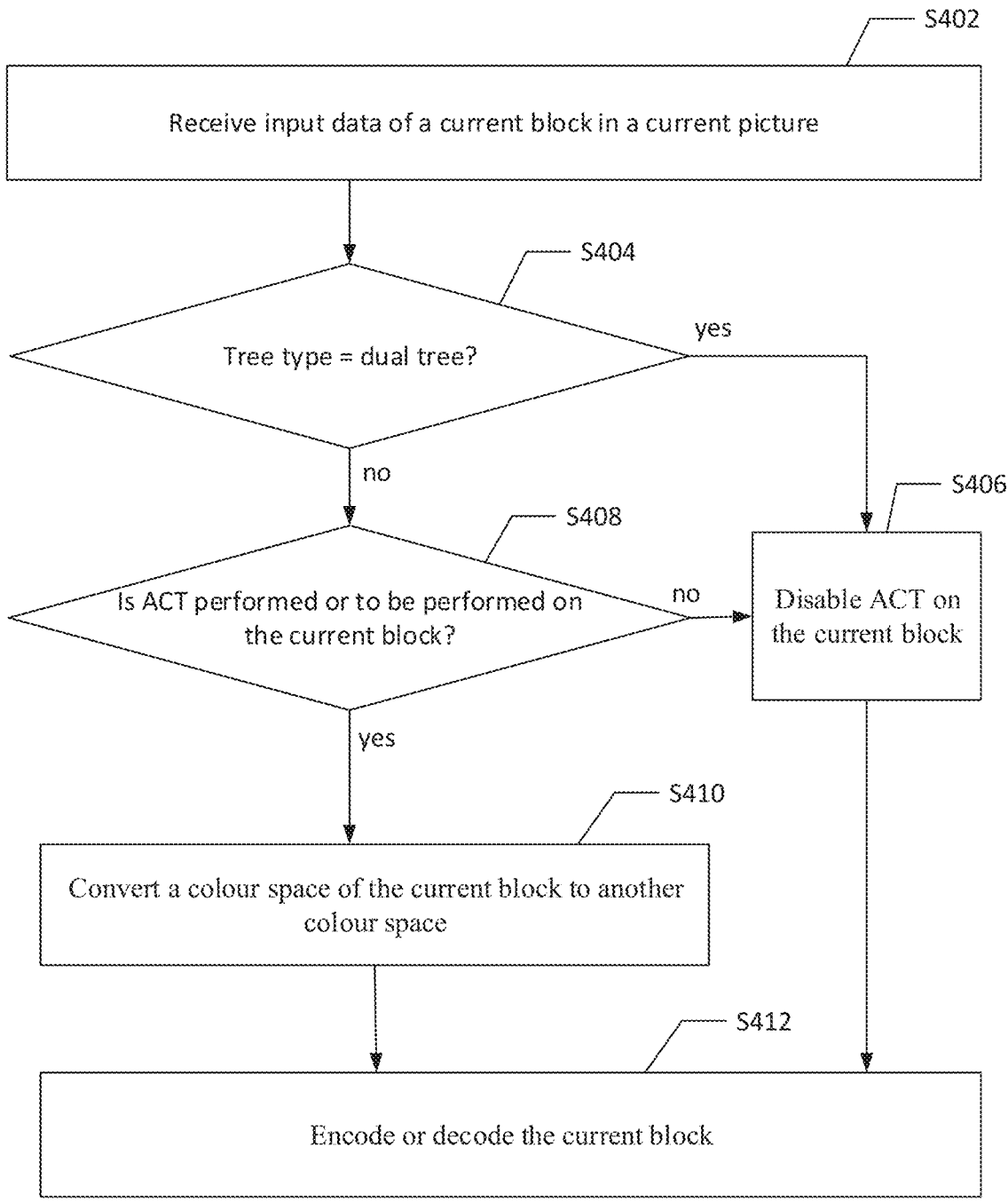
FIG. 4 is a flowchart illustrating a video processing method for encoding or decoding a current block with adaptive colour transform according to an exemplary embodiment of the present invention.

FIG. 4 is a flowchart illustrating a video processing method for processing a current block with adaptive colour transform according to an embodiment. The video processing method illustrated in FIG. 4 may be implemented in a video encoder or video decoder. The video encoder or video decoder receives input data associated with a current block in a current picture in step S402, and determines if a tree type of the current block is dual tree block partitioning in step S404. Luma and chroma components of the current block are coded using different splitting trees if the tree type of the current block is dual tree block partitioning whereas the luma and chroma components of the current block are coded using a single splitting tree if the tree type of the current block is single tree block partitioning. The video encoder or video decoder determines to disable ACT on the current block if the tree type of the current block is dual tree block partitioning in step S406. If the tree type of the current block is not dual tree block partitioning, the tree type is single tree block partitioning, and the video encoder or decoder further determines whether ACT is performed or to be performed on the current block in step S408. In some embodiments, ACT is only performed on the current block if the current block is predicted by intra prediction, so the video encoder or decoder determines to disable ACT on the current block when the current block is not predicted by intra prediction. In one embodiment of the video encoder, ACT is not performed on the current block if intra prediction directions for the luma component and the chroma components are different. The video encoder signals an ACT flag of the current block when the current block is predicted by intra prediction and coded using a single tree block partitioning. Similarly, the video decoder in this embodiment parses an ACT flag of the current block when the current block is predicted by intra prediction and coded using a single tree block partitioning. The video decoder determines whether ACT is performed on the current block according to the ACT flag of the current block. The ACT flag for a block is inferred to be false indicating ACT is not performed on the block if it is not signaled in the video bitstream. In step S406, ACT is disabled on the current block if the video encoder or decoder determines ACT is not performed or to be performed on the current block according to step S408. If the video encoder or decoder determines ACT is performed or to be performed on the current block according to step S408, a colour space of the current block is converted to another colour space in step S410. The current block is encoded or decoded in step S412. In one embodiment of performing ACT on residues, the video encoder converts a RGB colour space of the residues of the current block to a YCoCg colour space in step S410, whereas the video decoder converts the YCoCg colour space of recovered residues of the current block to a RGB colour space in step S410. In one embodiment of performing ACT on input data and predictors, the video encoder converts a RGB colour space of the input data and predictor of the current block to a YCoCg colour space in step S410, whereas the video decoder converts a RGB colour space of the predictor to a YCoCg colour space and converts the YCoCg colour space of the reconstructed current block back to the RGB colour space in step S410.

Representative Block Diagrams

Figure 5:
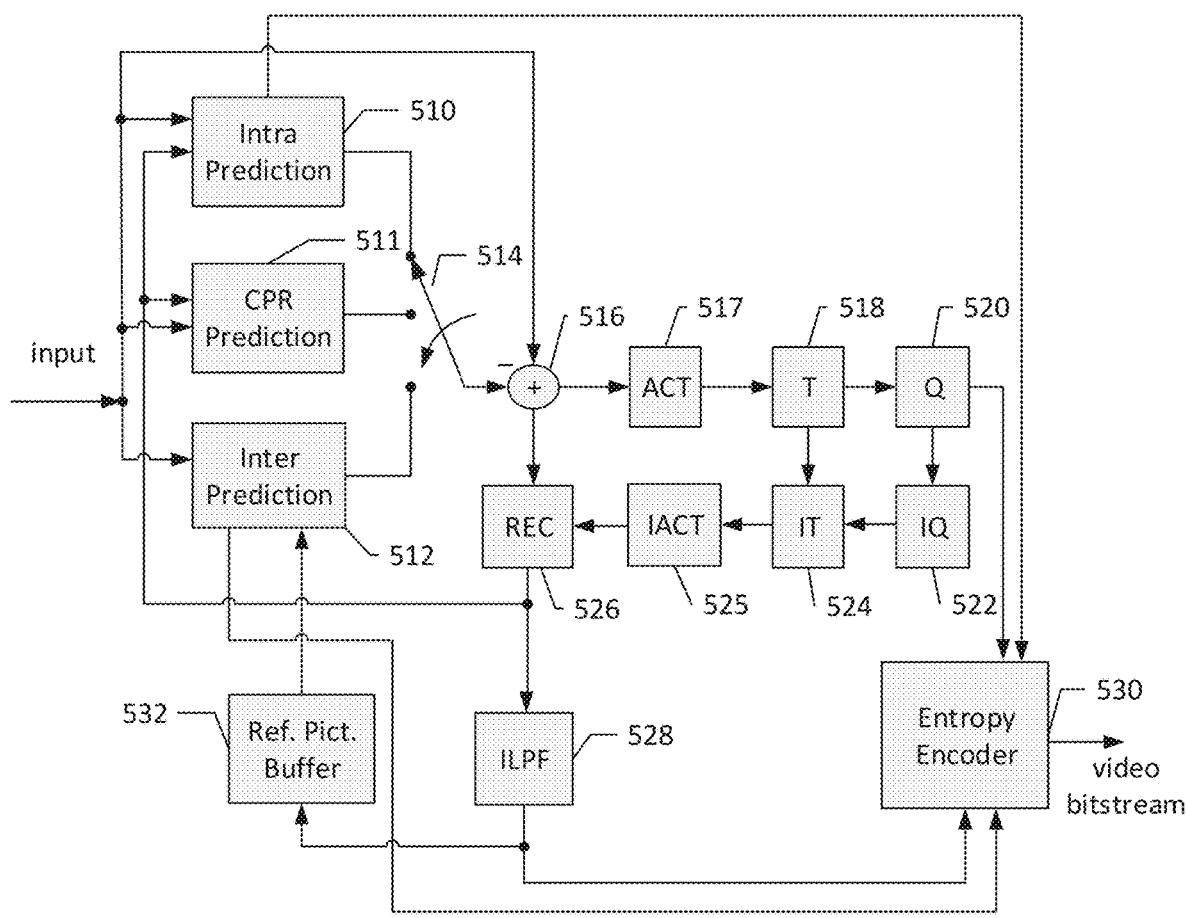
FIG. 5 illustrates an exemplary system block diagram for a video encoding system incorporating the video processing method according to embodiments of the present invention.

Any of the foregoing described video processing methods can be implemented in encoders, decoders, or both the encoders and decoders, for example, any of the video processing methods is implemented in an ACT module or an inverse ACT module of an encoder or decoder. Alternatively, any of the video processing methods can be implemented as a circuit coupled to the ACT module or inverse ACT module of the encoder or decoder, so as to provide information needed by the ACT module or inverse ACT module. FIG. 5 illustrates an exemplary system block diagram for a Video Encoder 500 implementing one or more of the video processing methods of the present invention with ACT applied to prediction residues. The Video Encoder 500 receives input data of a current block in a current picture. In cases when the current block is to be processed by intra prediction, Intra Prediction module 510 provides an intra predictor for the current block based on reconstructed samples of the current picture according to an intra prediction mode. In cases when the current block is to be processed by CPR, CPR Prediction module 511 provides a CPR predictor based on a CPR MV of the current block. In cases when the current block is processed by inter prediction, Inter Prediction module 512 performs motion estimation (ME) and motion compensation (MC) to provide an inter predictor based on video data from other picture or pictures according to one or two MVs of the current block. One of Intra Prediction module 510, CPR Prediction module 511, and Inter Prediction module 512 supplies the selected predictor to Adder module 516 to form prediction errors, also called prediction residues.

The prediction residues of the current block are further processed by Transformation (T) module 518 followed by Quantization (Q) module 520. Embodiments of the present invention disables ACT when luma and chroma components are coded using different splitting trees, that is ACT can only be performed on blocks coded using single tree block partitioning. The colour space of the transformed and quantized residual signal of the current block is converted to another colour space in ACT module 517 when ACT is to be performed on the current block. For example, ACT module 517 transforms a RGB colour space of the transformed and quantized residual signal into an YCoCg colour space. ACT module 517 is bypassed when ACT is disabled. Entropy Encoder 534 then encodes the processed residues of the current block to form an encoded video bitstream. The encoded video bitstream is then packed with side information. The side information includes one or more ACT flag indicating whether ACT is performed. The processed residues of the current block are recovered by Inverse Quantization (IQ) module 522 and Inverse Transformation (IT) module 524, and the colour space of the recovered residues of the current block is converted back to the original colour space by Inverse ACT (IACT) module 525 if ACT is performed on the current block. For example, IACT module 525 transforms the YCoCg colour space of the recovered residues back into the RGB colour space. As shown in FIG. 5, the recovered residues are added back to the selected predictor at Reconstruction (REC) module 526 to produce reconstructed samples. The reconstructed samples may be stored in Reference Picture Buffer (Ref. Pict. Buffer) 532 and used for prediction of other pictures. The reconstructed samples from REC 526 may be subject to various impairments due to the encoding processing, consequently, in-loop processing Deblocking Filter (DF) 528 and Sample Adaptive Offset (SAO) 530 are applied to the reconstructed samples before storing in the Reference Picture Buffer 532 to further enhance picture quality. Syntax associated with information for the in-loop processing DF 528 and SAO 530 are provided to Entropy Encoder 534 for incorporation into the encoded video bitstream.

Figure 6:
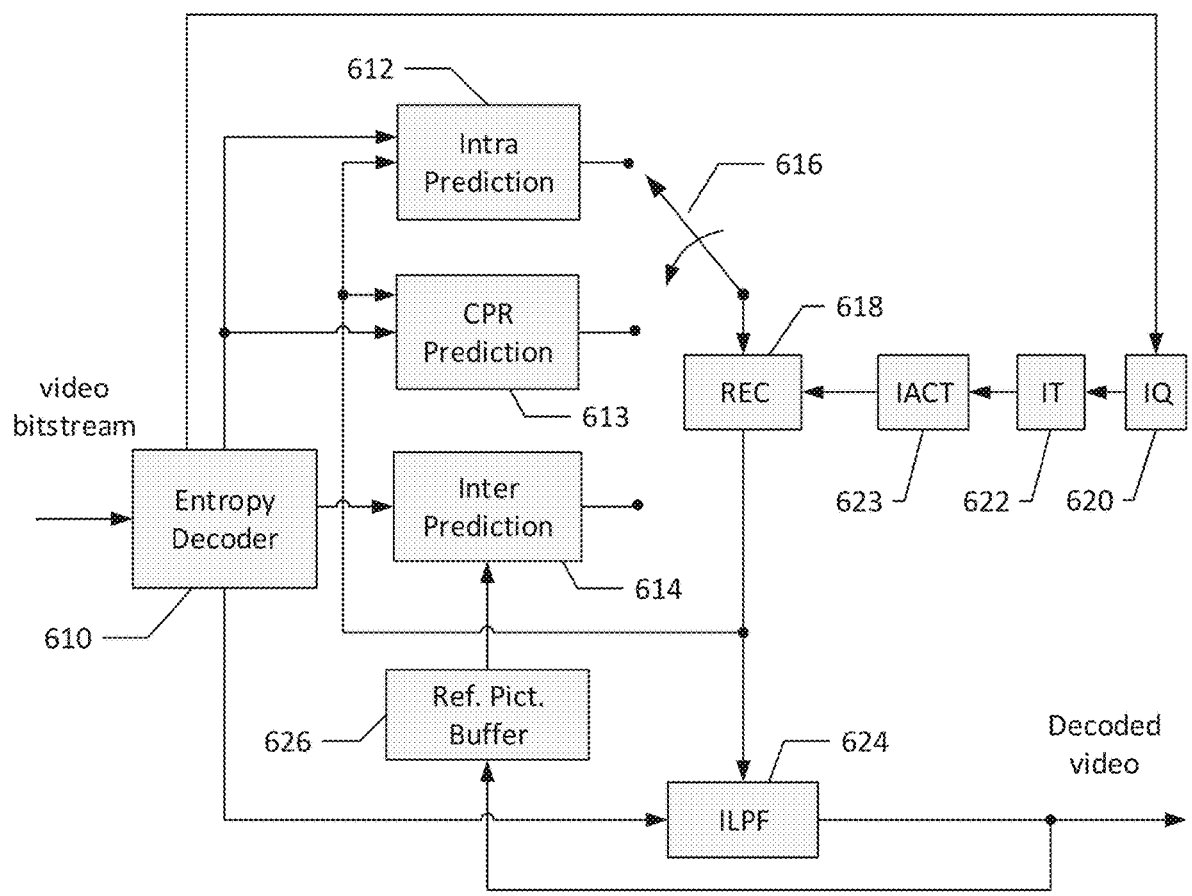
FIG. 6 illustrates an exemplary system block diagram for a video decoding system incorporating the video processing method according to embodiments of the present invention.

A corresponding Video Decoder 600 for decoding the video bitstream generated by Video Encoder 500 of FIG. 5 is shown in FIG. 6. The encoded video bitstream is the input to Video Decoder 600 and is decoded by Entropy Decoder 610 to parse and recover the transformed and quantized residual signal and other system information. The decoding process of Decoder 600 is similar to the reconstruction loop at Encoder 500, except Decoder 600 only requires motion compensation prediction in Inter Prediction module 614. The current block is decoded by Intra Prediction module 612, CPR Prediction module 613, or Inter Prediction module 614. Switch module 616 selects an intra predictor from Intra Prediction module 612, a CPR predictor from CPR Prediction module 613, or an Inter predictor from Inter Prediction module 614 according to decoded mode information. Parsed residues of the current block are recovered by Inverse Quantization (IQ) module 620 and Inverse Transformation (IT) module 622. Inverse ACT (IACT) module 623 further converts the colour space of the current block if ACT is used to encode the current block. For example, the IACT module 623 transforms the YCoCg colour space of recovered residues back to the RGB colour space. The recovered residues of the current block are reconstructed by adding back the predictor in REC module 618 to produce reconstructed samples. The reconstructed samples are further processed by DF 624 and SAO 626 to generate final decoded video. If the currently decoded picture is a reference picture, the reconstructed samples of the currently decoded picture are also stored in Ref. Pict. Buffer 628 for later pictures in decoding order.

Various components of Video Encoder 500 and Video Decoder 600 in FIG. 5 and FIG. 6 may be implemented by hardware components, one or more processors configured to execute program instructions stored in a memory, or a combination of the hardware and processor. For example, a processor executes program instructions to control receiving of input data associated with a current block in a current picture. The processor is equipped with a single or multiple processing cores. In some examples, the processor executes program instructions to perform functions in some components in Encoder 500 and Decoder 600, and the memory electrically coupled with the processor is used to store the program instructions, information corresponding to the reconstructed images of blocks, and/or intermediate data during the encoding or decoding process. The memory in some embodiment includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable medium listed above. As shown in FIGS. 5 and 6, Encoder 500 and Decoder 600 may be implemented in the same electronic device, so various functional components of Encoder 500 and Decoder 600 may be shared or reused if implemented in the same electronic device. For example, one or more of Reconstruction module 526, Inverse Transformation module 524, Inverse Quantization module 522, Inverse ACT module 525, Deblocking Filter 528, Sample Adaptive Offset 530, and Reference Picture Buffer 532 in FIG. 5 may also be used to function as Reconstruction module 618, Inverse Transformation module 622, Inverse Quantization module 620, Inverse ACT 623, Deblocking Filter 624, Sample Adaptive Offset 626, and Reference Picture Buffer 628 in FIG. 6.

Embodiments of the processing method for a video coding system may be implemented in a circuit integrated into a video compression chip or program code integrated into video compression software to perform the processing described above. For examples, determining if a luma component and chroma components of the current block are coded using different splitting trees may be realized in program code to be executed on a computer processor, a Digital Signal Processor (DSP), a microprocessor, or field programmable gate array (FPGA). These processors can be configured to perform particular tasks according to the invention, by executing machine-readable software code or firmware code that defines the particular methods embodied by the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of processing video data in a video coding system, comprising:
receiving input data associated with a current block in a current picture;
determining if a luma component and chroma components of the current block are coded using different splitting trees;
determining to disable Adaptive Colour Transform (ACT) on the current block when the luma component and the chroma components of the current block are coded using different splitting trees, wherein a colour space of the current block is converted to another colour space when ACT is performed on the current block; and
encoding or decoding the current block.

2. The method of claim 1, wherein the step of determining to disable ACT on the current block further comprises setting or inferring an ACT flag of the current block to be false when the luma component and the chroma components of the current block are coded using different splitting trees.

3. The method of claim 2, further comprising transmitting or parsing the ACT flag of the current block when the luma component and the chroma components of the current block are coded using a single splitting tree.

4. The method of claim 1, further comprising:
predicting the current block to generate a predictor;
generating residues of the current block from the predictor;
determining whether to perform ACT on the current block when the luma component and the chroma components of the current block are coded using a single splitting tree; and
converting a RGB colour space of the residues of the current block to an YCoCg colour space when performing ACT on the current block.

5. The method of claim 4, wherein the step of determining whether to perform ACT on the current block further comprises determining if the current block is predicted by intra prediction, and disabling ACT on the current block when the current block is not predicted by intra prediction.

6. The method of claim 5, wherein the step of determining whether to perform ACT on the current block further comprises determining whether intra prediction directions for the luma component and chroma components are different when the current block is predicted by intra prediction, and disabling ACT on the current block when the intra prediction directions for the luma component and the chroma components are different.

7. The method of claim 1, further comprising:
recovering residues of the current block by decoding the current block;
determining whether ACT is applied to the current block when the luma component and the chroma components of the current block are coded using a single splitting tree; and
converting a YCoCg colour space of the recovered residues of the current block to a RGB colour space when ACT is applied to the current block.

8. The method of claim 7, wherein the step of determining whether ACT is applied to the current block further comprises determining if the current block is predicted by intra prediction, and disabling ACT on the current block when the current block is not predicted by intra prediction.

9. The method of claim 8, wherein the step of determining whether ACT is applied to the current block further comprises parsing an ACT flag of the current block when the current block is predicted by intra prediction and is coded using a single splitting tree, and determining whether ACT is applied to the current block according to the ACT flag of the current block.

10. The method of claim 7, further comprising parsing a high-level ACT flag from a Sequence Parameter Set (SPS) or Picture Parameter Set (PPS) corresponding to the current picture, and the step of determining whether ACT is applied to the current block is only performed when the high-level ACT flag is true and the luma component and the chroma components of the current block are coded using a single splitting tree.

11. The method of claim 10, wherein ACT is disabled on any block in the current picture when the high-level ACT flag is false.

12. The method of claim 1, further comprising:
predicting the current block to generate a predictor;
determining whether to perform ACT on the current block when the luma component and the chroma components of the current block are coded using a single splitting tree; and
converting a RGB colour space of the input data and predictor of the current block to a YCoCg colour space when ACT is performed on the current block.

13. The method of claim 12, wherein the step of determining whether to perform ACT on the current block further comprises determining if the current block is predicted by intra prediction, and disabling ACT on the current block when the current block is not predicted by intra prediction.

14. The method of claim 13, wherein the step of determining whether to perform ACT on the current block further comprises determining whether intra prediction directions for the luma component and chroma components are different when the current block is predicted by intra prediction, and disabling ACT on the current block when the intra prediction directions for the luma component and the chroma components are different.

15. The method of claim 1, further comprising:
recovering residues of the current block by decoding the current block;
predicting the current block to generate a predictor;
determining whether ACT is applied to the current block when the luma component and the chroma components of the current block are coded using a single splitting tree;
when ACT is applied to the current block,
converting a RGB colour space of the predictor to a YCoCg colour space;
reconstructing the current block using the converted predictor and the recovered residues; and
converting the YCoCg colour space of the reconstructed current block to the RGB colour space; and
when ACT is not applied to the current block,
reconstructing the current block using the predictor and the recovered residues.

16. The method of claim 15, wherein the step of determining whether ACT is applied to the current block further comprises determining if the current block is predicted by intra prediction, and disabling ACT on the current block when the current block is not predicted by intra prediction.

17. The method of claim 16, wherein the step of determining whether ACT is applied to the current block further comprises parsing an ACT flag of the current block when the current block is predicted by intra prediction and is coded using a single splitting tree, and determining whether ACT is applied to the current block according to the ACT flag of the current block.

18. The method of claim 15, further comprising parsing a high-level ACT flag from a Sequence Parameter Set (SPS) or Picture Parameter Set (PPS) corresponding to the current picture, and the step of determining whether ACT is applied to the current block is only performed when the high-level ACT flag is true and the luma component and the chroma components of the current block are coded using a single splitting tree.

19. An apparatus of processing video data in a video coding system, the apparatus comprising one or more electronic circuits configured for:
receiving input data associated with a current block in a current picture;
determining if a luma component and chroma components of the current block are coded using different splitting trees;
determining to disable Adaptive Colour Transform (ACT) on the current block when the luma component and the chroma components of the current block are coded using different splitting trees, wherein a colour space of the current block is converted to another colour space when ACT is performed on the current block; and
encoding or decoding the current block.

20. A non-transitory computer readable medium storing program instruction causing a processing circuit of an apparatus to perform a video processing method for video data, and the method comprising:
- receiving input data associated with a current block in a current picture;
- determining if a luma component and chroma components of the current block are coded using different splitting trees;
- determining to disable Adaptive Colour Transform (ACT) on the current block when the luma component and the chroma components of the current block are coded using different splitting trees, wherein a colour space of the current block is converted to another colour space when ACT is performed on the current block; and
- encoding or decoding the current block.

* * * * *